United States Patent [19]

Zoller

[11] 4,368,016

[45] Jan. 11, 1983

[54] APPARATUS FOR FEEDING A CANDY FILLING FORCED OUT OF A CONVEYOR INTO A ROD FORMING APPARATUS

[75] Inventor: Roland Zoller, Karlsruhe, Fed. Rep. of Germany

[73] Assignee: Wiesert, Loser & Sohn GmbH & Co., Karlsruhe, Fed. Rep. of Germany

[21] Appl. No.: 238,986

[22] Filed: Feb. 27, 1981

[30] Foreign Application Priority Data

Aug. 27, 1980 [DE] Fed. Rep. of Germany ... 8022820[U]

[51] Int. Cl.³ .................. A23G 3/10; A23G 3/12; A23G 3/22; B29F 3/02
[52] U.S. Cl. .......................... 425/94; 425/112; 425/113; 425/122; 425/324.1; 425/366; 425/377; 425/378 R; 425/381

[58] Field of Search .............. 426/512, 516, 517; 425/324.1, 325, 335, 337, 366, 363, 376 R, 377, 378 R, 383, 384, 392, 394, 376 B, 380, 367, 328, 329, 112, 113, 122, 378, 90, 94, 96, 101, 104, 106, 381; 285/55, 184, 185, 283

[56] References Cited

U.S. PATENT DOCUMENTS

| B 364,786 | 1/1975 | Perd ................................ 285/55 |
| 1,064,741 | 6/1913 | Jones ............................ 425/366 |
| 2,559,648 | 7/1951 | Lindhe ........................... 425/366 |
| 2,739,778 | 3/1956 | Krone et al. .................. 285/184 |
| 2,953,161 | 9/1960 | Muller ............................ 285/184 |
| 4,140,463 | 2/1979 | Brinkmann et al. ........... 425/377 |

*Primary Examiner*—Willard E. Hoag
*Attorney, Agent, or Firm*—Paul M. Craig, Jr.

[57] ABSTRACT

An apparatus for introducing a candy filling forced out of a conveyor into a rod-forming machine in which the candy composition receives its final shape. A filling tube extends into an interspace between conical rolls of the rod-forming machine and a rigid connecting pipe is hingedly inserted between the conveyor and the filling tube by way of movable pipe fittings.

27 Claims, 3 Drawing Figures

FIG. I.

APPARATUS FOR FEEDING A CANDY FILLING FORCED OUT OF A CONVEYOR INTO A ROD FORMING APPARATUS

The present invention relates to a candy manufacturing apparatus and, more particularly, to an apparatus for feeding a candy filling forced out of a conveyor into a rod-forming machine which gives a composition of candy its final shape, with a filling tube extending into an interspace of conical rollers of the rod-forming machine.

Mechanical devices for the manufacture of candy have been proposed wherein the candy has a hard outer jacket or covering and a soft filling of a syrupy consistency. These proposed devices generally include a conveying pump for the filling of the candy and a rod-forming machine with conical rollers for shaping a rod, rope, or strand of the candy mass containing the filling. In an operation of these proposed devices, the filling is fed by the conveying pump with the aid of a flexible hose of a synthetic resin under moderate pressure to a filling tube extending into an interspace of conical rollers of the rod-forming machine. The use of a flexible hose is absolutely necessary since the conical rollers must be pivoted up and down during a forming step of the candy.

There has been a desire for some time to utilize these proposed devices also for the manufacture of candies which contain, in addition to a hard outer coat, a hard tough filling. However, in view of the consistency of the candy filling, the use of conveying pumps is precluded so that the use of an extruder in place thereof has been contemplated. In this connection, it was found that, even though it is possible to attain required pressures with the air of an extruder in order to press the hard filling through the filling tube into the interspace between the conical rollers in the rod forming machine, these pressures are so high that none of the industrially manufactured hoses of synthetic resin material which connect the extruder with the filling tube can withstand such pressures even to an approximate extent.

The air underlying the present invention essentially resides in providing an apparatus for enabling a continuous manufacture of filled candies having a hard or tough outer coat and a filling of approximately the same consistency.

In accordance with advantageous features of the present invention, a pressure resistant low-friction and flexible connection is provided between a conveying means such as an extruder and a filling tube. Advantageously, the pressure-resistant low-friction flexible connection takes the form of a rigid connecting pipe hingedly inserted, through movable pipe fittings, between the conveyor and the filling tube. By virtue of the provision of a connecting tube constructed in this manner, the required pressure may be controlled relatively readily and the provision of the two movable pipe fittings enable the filling tube to follow the pivotal motions of the conical rollers.

In accordance with the present invention, the rigid connecting pipe includes a steel pipe surrounding a synthetic resin pipe, with the outer steel pipe absorbing the pressure and the inner synthetic resin pipe effecting the conveyance of the filling for the candy.

Advantageously, in accordance with further features of the present invention, in order to reduce friction between the candy filling and wall of the synthetic resin pipe, the synthetic resin pipe is formed of a low friction material such as, for example, polytetrafluoroethylene.

In order to prevent a cooling of the candy filling during interruptions in the manufacturing process, advantageously, in accordance with further features of the present invention, the connecting pipe suitably carries a heating jacket which may extend over an entire length of the pipe.

For constructional reasons, in accordance with yet another feature of the present invention, the connecting pipe is provided with end-positioned flanges to which the pipe fittings are attached.

Moreover, in order to enable a fixing of a position of the synthetic resinous pipe within the steel pipe, the synthetic resinous pipe is equipped, with a mounting flange at its inlet.

In accordance with still further features of the present invention, coupling cylinders are provided and used as pipe fittings. The coupling cylinders carry pipe sockets fed into a cross bore and provided with counter flanges. The coupling cylinders are pivotally fitted into housings, which housings are of a cylindrical shape in an interior thereof and equipped with a transverse opening for the pipe fittings. The housings are arranged at the conveyor as well as at the filling pipe.

Accordingly, it is an object of the present invention to provide an apparatus for feeding a candy filling forced out of a conveyor into a rod-forming machine which avoids, by simple means, shortcomings and disadvantages encountered in the prior art.

A further object of the present invention resides in providing an apparatus for feeding a candy filling forced out of a conveyor into a rod-forming machine which enable the continuous manufacture of filled candies having a filling approximately the same consistency as the outer coat.

Yet another object of the present invention resides in providing an apparatus for feeding a candy filling forced out of a conveyor into a rod-forming machine which maintains the filling at the proper consistency to ensure conveyance thereof even during interruptions in the manufacturing process of the candy.

A still further object of the present invention resides in providing an apparatus for feeding a candy filling forced out of a conveyor into a rod-forming machine which functions reliably under all operating conditions.

Another object of the present invention resides in providing an apparatus for feeding a candy filling forced out of a conveyor into a rod-forming machine which is simple in construction and therefore relatively inexpensive to manufacture.

These and other objects, features, and advantages of the present invention will become more apparent from the following description when taken in connection with the accompanying drawings which show, for the purpose of illustration only, one embodiment in accordance with the present invention, and wherein.

Figure 1:
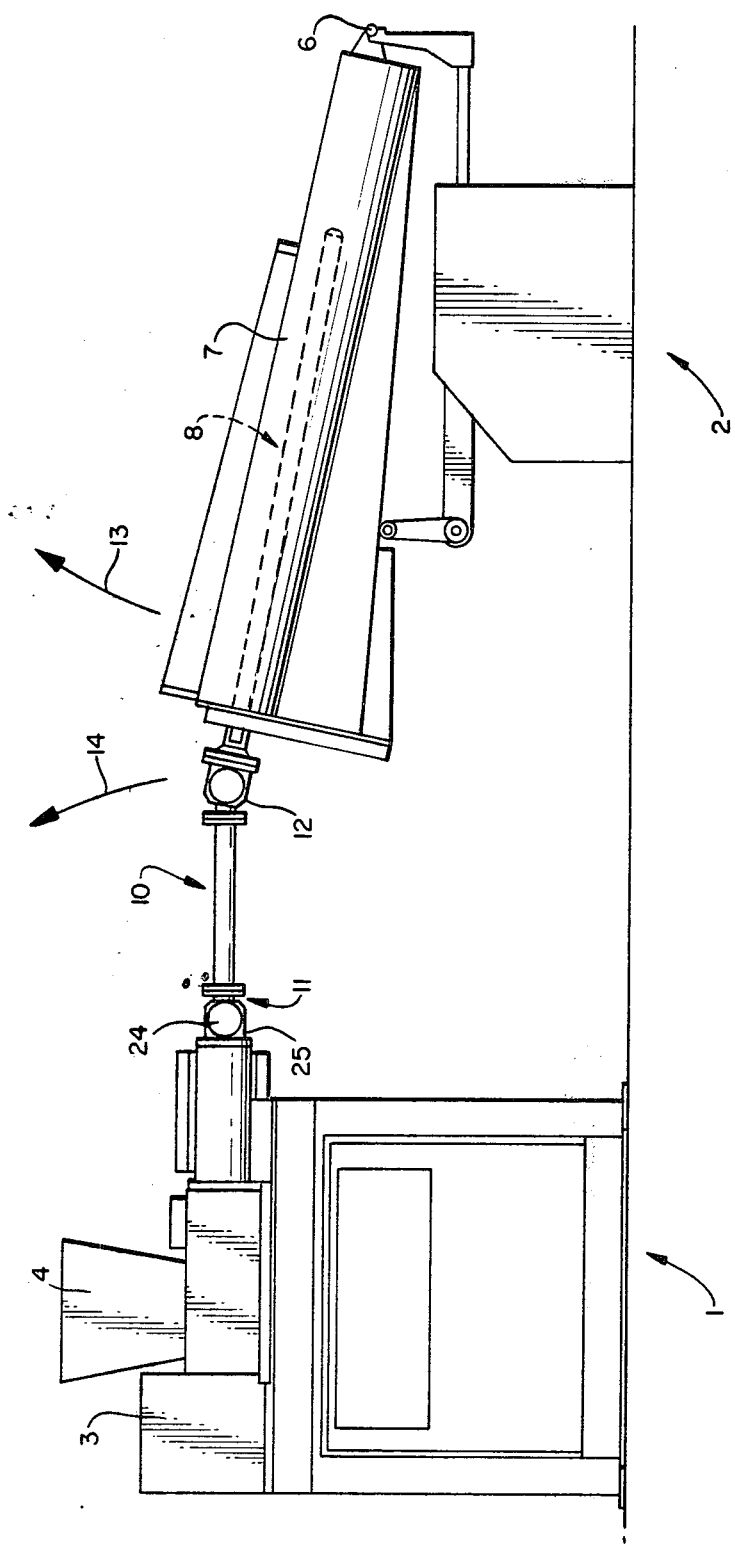
FIG. 1 is a partially schematic lateral view of an apparatus for the manufacture of filled candies constructed in accordance with the present invention.

Referring now to the drawings wherein like reference numerals are used throughout the various views to designate like parts and, more particularly, to FIG. 1, according to this Figure, an apparatus for the continuous manufacture of candies having a harder tough candy mass resulting in an outer jacket and a candy filling having approximately the same consistency as the outer jacket includes a conveyor generally designated by the reference numeral 1, formed as a screw extruder and a rod-forming machine generally designated by the reference numeral 2. Cutting and packaging machines (not shown) are disposed downstream of and connected to the rod-forming machine 2.

The conveyor or screw extruder 1 is disposed on a machine table 1' and includes a drive mechanism 3, with a fed hopper 4 being provided for enabling a feeding or conveying of filling to a screw 5 (FIG. 2) of the conveyor or screw extruder 1.

The rod-forming machine 2 includes several conical rolls (not shown) disposed in a roll housing 7 and mounted, in a conventional manner, so as to be pivotable about a pivot axis 6. The prepared candy composition or mass which yields the outer coat is placed on the conical rolls and, by alternate rotation of the conical rolls in both directions, the candy composition is shaped into a rod.

A filling tube generally designated by the reference numeral 8 extends into an interspace of the conical rolls of the rod-forming machine 2. The filling tube 8 enables the continuous introduction of the candy filling into a center of the candy composition during a shaping of the candy composition by the conical rolls.

Figure 2:
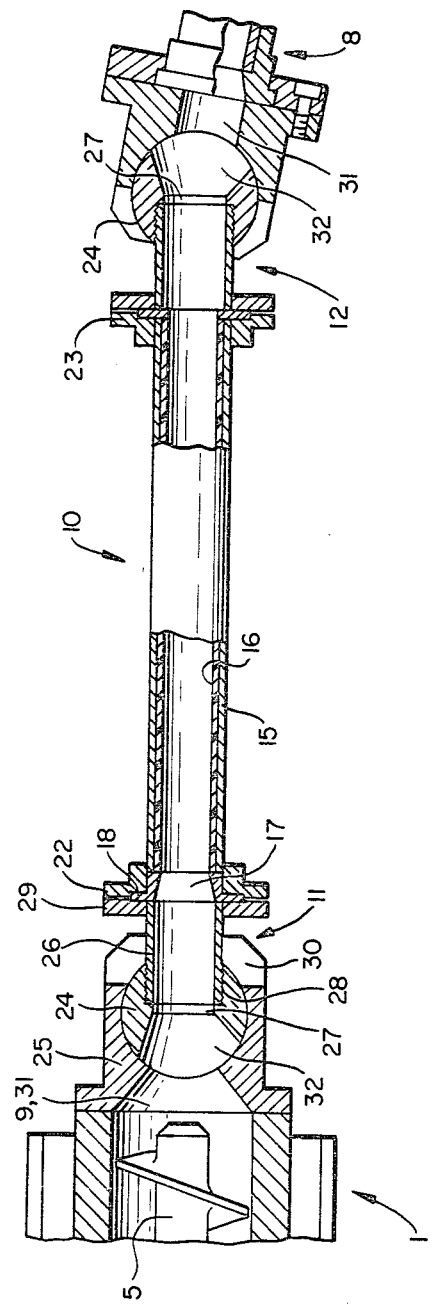
FIG. 2 is a partial longitudinal cross sectional view of a connecting pipe and movable pipe fittings in accordance with the present invention; and, FIG. 3 is a longitudinal cross sectional view of a further embodiment of a connecting pipe in accordance with the present invention provided with a heating jacket.

As shown most clearly in FIG. 2 a rigid connecting pipe 10 is interposed or inserted between the filling tube 8 and a die 9 of the conveyor or screw extruder 1. A movable pipe fitting generally designated by the reference numeral 11 is arranged between one end of the rigid connecting pipe 10 and the die 9 of the screw extruder 1 with a second movable pipe fitting generally designated by the reference numeral 12 being disposed betweeen the other end of the rigid connecting pipe 10 and the filling tube 8. If the roll housing 7 of the rod-forming machine 2 is pivoted upwardly about the swivel or pivot axle 6 in a direction of the arrow 13 (FIG. 1) during a shaping step of the candy, then the connecting pipe 10 is likewise pivoted upwardly in an opposite direction indicated by the arrow 14 (FIG. 1) so that the filling tube 8 retains its position relative to the roll housing 7 and/or to the conical rolls of the rod-forming machine 2.

As also shown in FIG. 2, the connecting pipe 10 is a seamlessly drawn steel pipe 15 which tightly encloses a synthetic resin pipe 16. The steel pipe 15 is capable of withstanding pressures of, for example, 100 bar and above. The synthetic resin pipes 16 consist of a low friction material such as polytetrafluoroethylene and is provided, at a conically slightly flared inlet 17 facing the die 9 of the screw extruder 1, with an annular mounting flange 18.

Figure 3:
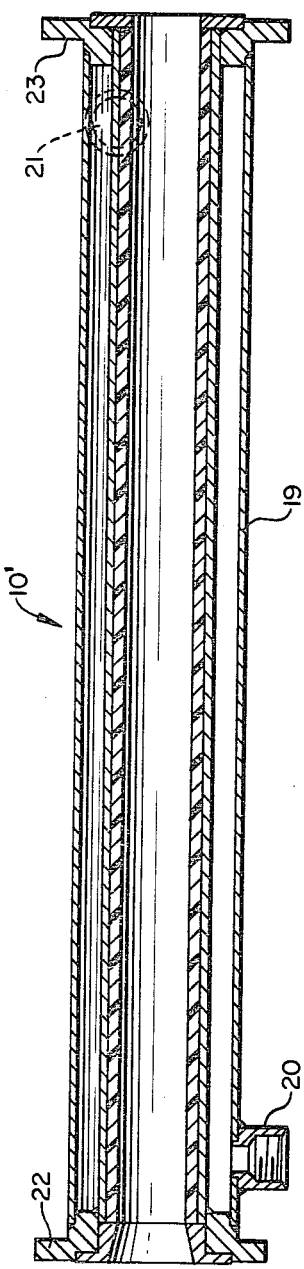

As shown in FIG. 3, a connecting part generally designated by the reference numeral 10' may be provided which includes a heating jacket 19 into which a heating medium such as, for example, hot water or low pressure steam may be introduced and removed by way of connections 20, 21.

The connecting pipe 10 or 10' may be provided at interspective ends with annular flanges 22, 23 which enable a threaded attachment of the respective ends of the connecting pipe 10 or 10' with the movable pipe fittings 11, 12.

Each of the pipe fittings 11, 12 include a coupling cylinder 24 seated tightly but pivotally movable in a housing 25 having an internal cylindrical shape. The coupling cylinder 24 and housing 25 form together a pivotal joint which enable the pipe fittings 11, 12 to move only in one plane.

Each coupling cylinder 24 carries a pipe socket 26 which is threaded into a cross bore 27 with the aid of a thread 28. Each of the pipe sockets 26 include an annular counter flange so as to enable a connection to be established between the flange 22 or 23 of the connecting pipe 10. In this situation, the annular mounting flange 18 simulaneously acts as a seal and is pressed into position upon connecting the flanges 22 or 23 with the annular counter flanges 29.

Each housing 25 is provided with a transverse opening 30 for accommodating the pipe socket 26 so as to enable the pipe socket 26 to pivot upwardly and downwardly in the transverse opening 30. A cross hole or opening 31 is arranged in opposition to the cross bore 27 of the coupling cylinder 24. The cross bore 27 includes a conical flaring portion 32 so as to permit the candy filling to pass from the conveyor or screw extruder 1 through the pipe fitting 11, through the pipe 10 and pipe fitting 12 to the filling tube in any pivotal position of the connecting pipe 10. The cross hole 31 and the pipe fitting 11 arranged at the conveyor or screw extruder 1 simultaneously constitutes the die 9 of the conveyor or screw extruder 1.

While I have shown and described only two embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. An apparatus for feeding a hard candy filling forced out of a conveyor means into a rod forming means having conical rollers for forming a candy composition into a final shape, comprising:
   (1) tube means for feeding said hard candy filling into said rod forming means to a space between said conical rollers;
   (2) rigid pipe means disposed between an outlet of said conveyor means and an inlet of said tube means, said rigid pipe means being able to withstand the pressures produced in the conveyor means to pass the hard candy filling through the tube means and into said rod forming means; and
   (3) mounting means hingedly mounting respective ends of said pipe means to the conveyor means and the tube means.

2. An apparatus according to claim 1, characterized in that said mounting means permits upward pivoting of said pipe means when said rod forming means pivots upwardly, whereby said tube means can follow the pivotal motions of said rod forming means and retain its position relative to said rod forming means.

3. An apparatus according to claim 1, characterized in that the mounting means includes a movable pipe fitting means respectively interposed between respective ends of the pipe means and the conveyor means and the tube means.

4. An apparatus according to claim 3, characterized in that the pipe means includes a first pipe of a synthetic resin material and a second pipe formed of a metallic material surrounding the first pipe.

5. An apparatus according to one of claims 1, 3, or 4, characterized in that means are provided for heating at least a portion of the pipe means.

6. An apparatus according to claim 4, characterized in that the synthetic resin material is a low friction material.

7. An apparatus according to claim 6, characterized in that the synthetic resin material is polytetrafluoroethylene.

8. An apparatus according to claim 7, characterized in that the metallic material is steel.

9. An apparatus according to claim 8, characterized in that means are provided for heating at least a portion of the pipe means.

10. An apparatus according to claim 9, characterized in that the heating means includes a heating jacket surrounding at least a portion of the second pipe.

11. An apparatus according to one of claims 3, 4, 6, 9, or 10, characterized in that means are provided on the first pipe for fixing a position thereof with respect to the second pipe.

12. An apparatus according to one of claims 3, 4, 6, 9, or 10, characterized in that flange means are provided at respective ends of the pipe means for enabling a connection of the pipe means to the movable pipe fitting means.

13. An apparatus according to claim 12, characterized in that the first pipe includes means at an inlet end thereof for fixing a position of the first pipe with respect to the second pipe.

14. An apparatus according to claim 13, characterized in that the fixing means comprises a flange.

15. An apparatus according to claim 14, characterized in that each of the movable pipe fittings includes a coupling cylinder means, pipe socket means for respectively communicating the pipe means with the conveyor means and the tube means, bore means for accommodating the pipe socket means, means for enabling an attachment of the respective coupling cylinder means to the conveyor means and the tube means, and housing means for pivotally accommodating the coupling cylinder means.

16. An apparatus according to claim 15, characterized in that each of the coupling cylinder means further includes a transversely extending opening for enabling the pipe socket means to pivot with the coupling cylinder means.

17. An apparatus according to claim 16, characterized in that each of the housing means has a cylindrically shaped interior for enabling a seating of the coupling cylinder means therein, and in that means are provided in the bore means for threadably securing the pipe socket means therein.

18. An apparatus according to claim 17, characterized in that flange means are provided in each of the housing means for enabling the respective housing means to be attached to the conveyor means and tube means.

19. Apparatus for manufacturing candy with a hard outer coating made from a candy composition and a hard filling, comprising:
(1) conveyor means;
(2) rod forming means having conical rollers for forming the candy composition into a final shape;
(3) tube means for feeding the hard filling into said rod forming means to a space between said conical rollers where said filling can be coated with a candy coating material applied to said rollers;
(4) rigid pipe means disposed between an outlet of said conveyor means and an inlet of said tube means, said rigid pipe means being able to withstand the pressures produced in the conveyor means to pass the hard filling through the tube means and into said rod formng means; and
(5) mounting means hingedly mounting respective ends of said pipe means to the conveyor means and the tube means.

20. An apparatus according to claim 19, characterized in that said conveying means is a screw extruder.

21. An apparatus according to claim 19, characterized in that said mounting means permits upward pivoting of said pipe means when said rod forming means pivots upwardly, whereby said tube means can follow the pivotal motions of said rod forming means and retain its position relative to said rod forming means.

22. An apparatus according to claim 19, characterized in that means are provided for heating at least a portion of the pipe means.

23. An apparatus according to claim 19, characterized in that the mounting means includes a movable pipe fitting means respectively interposed between respective ends of the pipe means and the conveyor means and tube means.

24. An apparatus according to claim 19, characterized in that the pipe means includes a first pipe of a synthetic resin material and a second pipe formed of a metallic material surrounding the first pipe.

25. An apparatus according to claim 24, characterized in that the synthetic resin material is a low friction material.

26. An apparatus according to claim 25, characterized in that the synthetic resin material is polytetrafluoroethylene.

27. An apparatus according to claim 24, 25, or 26, characterized in that the metallic material is steel.

* * * * *